No. 869,487. PATENTED OCT. 29, 1907.
B. E. ELDRED.
PROCESS OF MAKING GAS.
APPLICATION FILED FEB. 21, 1905.
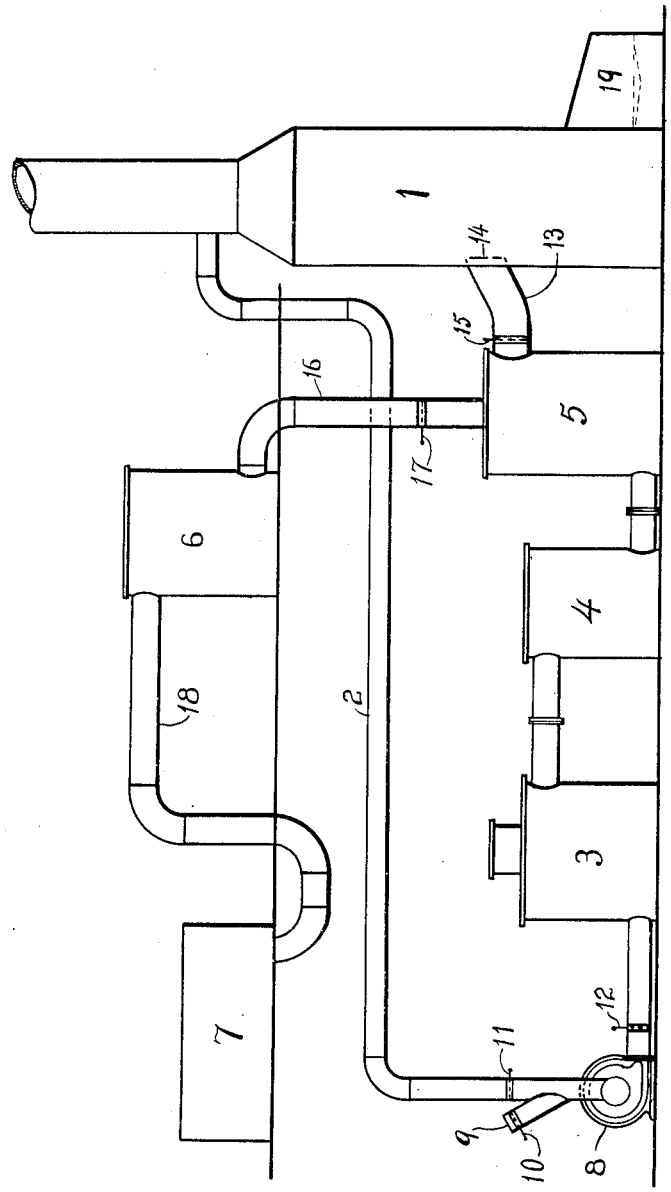
WITNESSES: INVENTOR

UNITED STATES PATENT OFFICE.

BYRON E. ELDRED, OF NEW YORK, N. Y., ASSIGNOR TO COMBUSTION UTILITIES COMPANY, OF NEW YORK, N. Y., A CORPORATION OF NEW YORK.

PROCESS OF MAKING GAS.

No. 869,487.  Specification of Letters Patent.  Patented Oct. 29, 1907.

Application filed February 21, 1905. Serial No. 246,795.

*To all whom it may concern:*

Be it known that I, BYRON E. ELDRED, a citizen of the United States, and a resident of New York city, in the county of New York and State of New York, have invented certain new and useful Improvements in Processes for the Manufacture of Combustible Gas, of which the following is a specification.

This invention relates to a method of manufacturing combustible gas which is similar in some respects to the water gas process, but differs essentially therefrom inasmuch as carbon dioxid instead of steam is used as the gasifying medium.

In the manufacture of carbureted water gas ordinarily three receptacles are used, known as the generator, carbureter and superheater. The generator contains a deep bed of coal-fire through which air is blown until the generator temperature is raised to a high degree while the products of combustion from this "blow" pass into the carbureter and finally into the superheater, thereby heating these two chambers. The hot gases from the superheater are finally permitted to depart to the stack. They leave the superheater at a high temperature and often contain unburned combustible gases, and consequently they may have fuel value. In the process hereinafter described a method is shown of utilizing in a novel manner these waste gases for the purpose of calcining lime or heating materials of a similar nature. After the bed of fuel in the water gas generator has been heated to the requisite temperature, steam is blown into the generator and water gas is thereby formed. The cooling action of the steam soon reduces the temperature of the fire below the point at which a good, combustible gas is produced, and there upon the steam blow is stopped and the air blow resumed.

In place of the use of steam as above outlined I particularly make use of the gaseous products of calcination of lime-stone or similar calcareous material. I can, of course, obtain carbon dioxid from other sources, as for instance, as a waste product in such chemical operations as glass manufacture and the like; but for general and economic application I find the enriched products of combustion obtained from the calcination of lime stone to be the most feasible.

My invention for the manufacture of combustible gas for illuminating, heating or power purposes consists in first blowing through a deep bed of ignited coal a pure-air draft in order to heat the coal to a high temperature, and then in passing through the incandescent fuel a draft-current composed chiefly of carbon dioxid and nitrogen, such as is obtained from a lime kiln. The products of the air-blow are allowed to pass into the lime kiln and to give up their heat for calcination purposes. The products of the carbon dioxid blow consist chiefly of carbon monoxid and nitrogen, and in about equal parts. If the gas is intended for illuminating purposes it is passed through a carbureter and superheater previously heated by the products of the air blow in the manner customary in the manufacture of water gas, whereupon the gases may be conducted to a scrubber and purified in any desired way.

The accompanying drawing illustrates apparatus which carries into effect the process above described.

In the drawing 1 is a lime kiln from the stack of which the pipe 2 is led to the fan blower 8 and thence to 3 which is a generator similar to those used in water gas manufacture.

4 and 5 are the carbureter and superheater respectively, attached to generator 3.

6 is a scrubber and 7 a gas holder. In the pipe 2 on the inlet side of the fan is an opening for the admission of air shown at 9. This is fitted with an adjustable gate 10. The pipe 2 is also supplied with a gate 11 on the inlet side of the fan and a gate 12 on the outlet side. The outlet side of pipe 2 connects with generator 3. The superheater 5 has a large conduit 14 extending from its upper part to the lime kiln and entering the kiln at 14. An adjustable gate in this conduit is shown at 15. A passage 16 extends from superheater 5 to the scrubber 6 and is supplied with the gate 17. A pipe 18 connects the scrubber 6 with the gas holder 7. A fire box attached to the lime kiln is shown at 19.

The operation of my process is as follows:—The lime kiln 1 is filled with lime-stone and a fire is started in the fire box 19. When the proper temperature for calcination is reached the gases departing up the stack of the kiln will contain from 25 to 40% carbon dioxid, or much more than is contained in ordinary products of combustion from burning fuel which, theoretically, cannot contain more than 21 per cent by volume and actually never do contain that much. A deep bed of fire is made in the generator 3 and by means of the fan blower an air blast is forced through the generator, the valve 11 being closed and valve 10 being open at this time. The products of combustion from this blow pass through the carbureter at 4 to the superheater 5 and heat them to a high temperature. The gases then pass through the conduit 15 into kiln 1. The gate 17 is closed during this operation. When the contents of the generator have reached the requisite temperature the gate 10 is closed and the gate 11 opened, whereupon carbon dioxid passes through the generator 3 and is therein reduced to carbon monoxid. The gas passes into the carbureter 4 and receives its complement of illuminating oil and this is subsequently fixed by contact with the heated checker work in superheater 5. During this operation the gate 15 is closed and the gate 17 opened so that the gas may pass through the pipe 16 to the scrubber 6 and from thence through pipe 18 to gas holder 7 where the gas is collected and distributed as desired.

In a joint application by myself and Carleton Ellis, the Serial No. of which is 243,601 we have described a method of continuous operation of a gas producer by a carbon dioxid carrying gas. Such a method is not claimed in the present invention, which relates solely to an intermittent gas making process.

What I claim is,

1. The process of making rich producer gas which consists in alternately blowing hot fuel with air and with products of combustion containing more than the normal proportion of carbon dioxid, and in collecting the gas formed in the latter blow.

2. The process of making rich producer gas which consists in alternately blowing hot fuel with air and with lime kiln gases, and in collecting the gas formed in the latter blow.

3. The process of making rich producer gas which consists in alternately blowing hot fuel with air and with lime kiln gases, employing the gaseous products of the first blow to calcine lime in the kiln and collecting for use the gas formed in the second blow.

4. The process of making gas which consists in alternately blowing hot fuel with air and with enriched products of combustion, substantially free of steam, passing the products of the first blow through a carbureting and a fixing chamber to heat the same, collecting the gas formed in the second blow and carbureting and fixing the same in the said heated chambers.

5. The process of making gas which consists in alternately blowing hot fuel with air and with lime kiln gases, substantially free of steam, collecting the gas formed in the second blow and carbureting and fixing the same.

6. The process of making gas which consists in alternately blowing hot fuel with air and with lime kiln gases, employing the gaseous products of the first blow to calcine lime in the kiln, collecting for use the gas formed in the second blow and carbureting and fixing the same.

7. As a new article of manufacture, a gas made by passing a draft-current carrying more than 25% by volume of carbon dioxid through a deep bed of incandescent fuel.

8. As a new article of manufacture, a combustible gas composed chiefly of carbon monoxid and nitrogen in about equal parts.

Signed at New York city, in the county of New York, and State of New York, this 17th day of February, A. D. 1905.

BYRON E. ELDRED.

Witnesses:
CARLETON ELLIS,
A. M. SENIOR.